United States Patent [19]

Tanaka et al.

[11] Patent Number: 4,796,978
[45] Date of Patent: Jan. 10, 1989

[54] PROJECTION TYPE LIQUID CRYSTAL DISPLAYING DEVICE

[75] Inventors: Sakae Tanaka; Tadahiko Yamaoka; Shingo Takahashi; Tomoaki Takahashi, all of Tokyo, Japan

[73] Assignee: Seikosha Co., Ltd., Tokyo, Japan

[21] Appl. No.: 70,789

[22] Filed: Jul. 7, 1987

[30] Foreign Application Priority Data

Jul. 8, 1986 [JP] Japan ................................ 61-159935

[51] Int. Cl.⁴ ............................ G02F 1/13; G02B 5/30
[52] U.S. Cl. .................................... 350/337; 350/352;
350/342; 350/397; 350/385
[58] Field of Search ............... 350/337, 352, 397, 385,
350/408, 342; 353/34, 37

[56] References Cited

U.S. PATENT DOCUMENTS 3,588,324  6/1971  Marie .................................. 350/408
4,190,832  2/1980  Mohler ............................... 350/337

FOREIGN PATENT DOCUMENTS 0097315  5/1985  Japan .................................. 350/337

Primary Examiner—Stanley D. Miller
Assistant Examiner—Trong Quang Phan
Attorney, Agent, or Firm—Bruce L. Adams; Van C. Wilks

[57] ABSTRACT

A projection type liquid crystal display device includes a light source and condenser lenses for emitting two beams of light which are orthogonal to each other. One of the light beams passes through a liquid crystal panel of one color, and the other light beam is further divided into two light beams each of which passes through liquid crystal panels of other colors. The three light beams are then synthesized by dichroic mirrors and fed to a projection lens system.

1 Claim, 4 Drawing Sheets

PROJECTION TYPE LIQUID CRYSTAL DISPLAYING DEVICE

BACKGROUND OF THE INVENTION

1. Technical Field of the Invention

The present invention is concerned with a projection type liquid crystal displaying device.

2. Description of the Related Art

A conventional projection type liquid crystal displaying device is disclosed in the specification of Japanese Patent Laid-Open No. 2916/1985. This device is arranged in such a way that three different liquid crystal panels on which picture elements of red, green and blue (R, G, B) are formed are employed; the individual panels are equipped with light sources; and the picture elements are displayed on a screen by synthesizing beams of light transmitting the liquid crystal panels with the aid of a dichroic mirror.

OBJECT OF THE INVENTION

The foregoing conventional device is disadvantageous because it requires three light sources, the efficiency of utilizing the light is lowered, and deterioration of the lamp causes the scattering of light which further reduces the quality of the picture. There is created an additional defect wherein its configuration as a whole becomes large.

Accordingly, it is a primary object of the present invention to provide an improved projection type liquid crystal displaying device which requires a single light source alone and can be miniaturized.

SUMMARY OF THE INVENTION

A projection type liquid crystal displaying device according to the present invention is constituted such that: the light emitted from a single light source is split into beams of parallel light of two groups which are orthogonal to each other; beams of the parallel light of one group are reflected at a right angle and are then led to a first liquid crystal panel; beams of the parallel light of the other group are led to a first dichroic mirror which reflects the light having specified wavelengths; the light reflected on this first dichroic mirror and the light transmitted by the first liquid crystal panel are sythesized by a second dichroic mirror; the light passing through the first dichroic mirror is reflected at a right angle on a reflection optical system and is then led to a third liquid crystal panel; and the light transmitted by the third liquid crystal panel and the light coming from the second dichroic mirror are synthesized by a third dichroic mirror.

DESCRIPTION OF THE PREFERRED EMBODIMENTS

Figure 1:
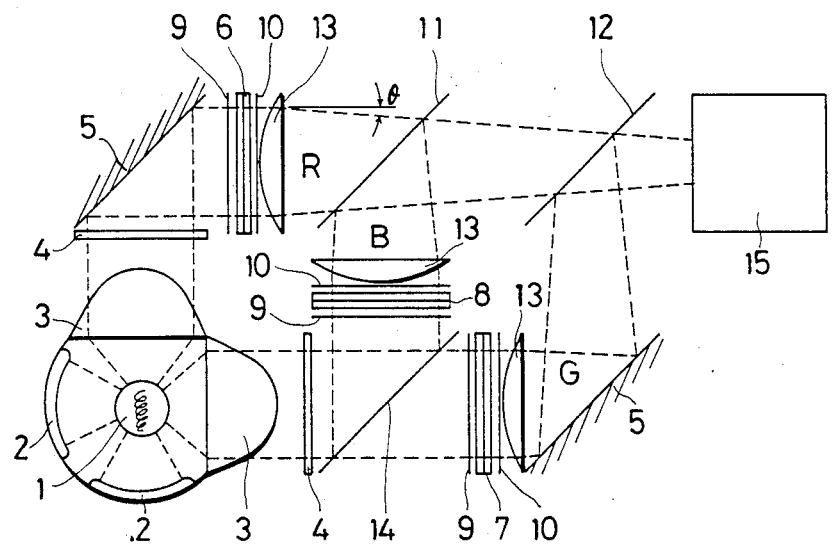
FIG. 1 is an explanatory view showing one embodiment of the present invention.
Figure 2:
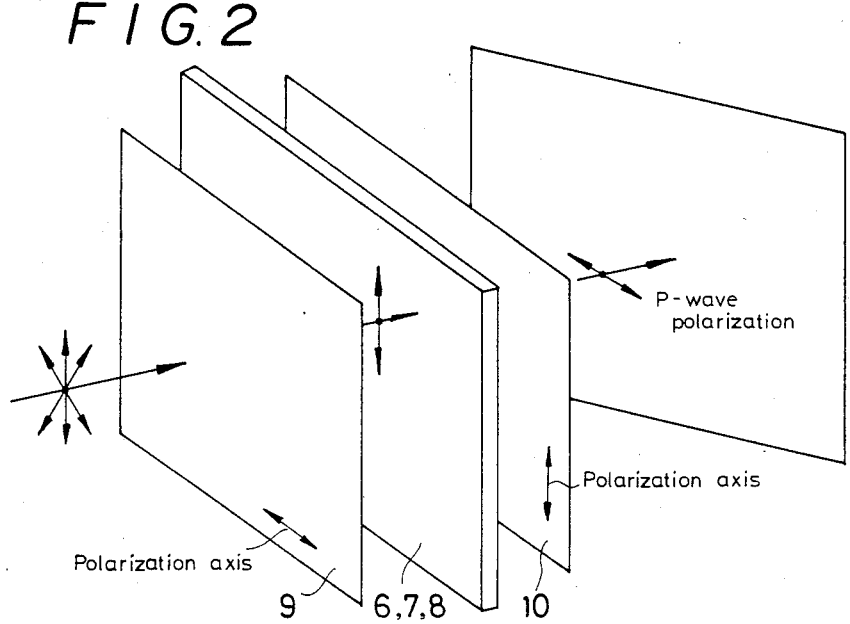
FIG. 2 is a perspective view showing one portion extracted from FIG. 1.

In FIG. 1, the numeral 1 represents a light source such as a halogen lamp or a xenon lamp; 2, 2 denote cold mirrors; 3, 3 designate condenser lenses for splitting the light emitted from the light source into beams of bidirectional light which are orthogonal to each other; 4, 4 designate heat protecting filters. The numerals 5, 5 represent reflection mirrors; 6 stands for a liquid crystal panel of R; 7 designates a liquid crystal panel of G; and 8 denotes a liquid crystal panel of B. In this embodiment, the liquid crystal panels 6, 7, 8 comprise positive TN type liquid crystal. Such is the arrangement that P-wave polarized light falls upon a B-reflection dichoric mirror 11 and upon a G-reflection dichroic mirror 12 by making use of two pieces of polarization plates 9, 10 which have, as illustrated in FIG. 2, polarization axes orthogonal to each other. The numerals 13, 13 denote convex lenses for converging beams of the parallel light by only $\theta$ ($0 \leq \theta \leq 5°$); 14 stands for a B-reflection dichroic mirror; and 15 designates a projection lens system.

In the above-described constitution, the light emitted from the light source 1 strikes directly, or after undergoing reflection on the cold mirrors 2, upon the condenser lenses 3 thereby to become beams of parallel light which travel in two directions. Beams of the parallel light are reflected via the heat protecting filters 4 on the reflection mirror 5 and are then fed to the liquid crystal panel 6. The light passing through the liquid crystal panel 6 is converged by $\theta$ by means of the convenx lens 13 and is led to the dichroic mirror 11.

On the other hand, the light of B is reflected on the dichroic mirror 14 and is fed through the liquid crystal panel 8 and the convex lens 13 to the dichroic mirror 11. Beams of the light transmitted through each of the liquid crystal panels 6, 7 are synthesized by the dichroic mirror 11 and are then led to the dichroic mirror 12.

The light passing through the dichroic mirror 14 further transmits through both the liquid crystal panel 7 and the convex lens 13 and is reflected on the mirror 5. The thus reflected light is fed to the dichroic mirror 12 and is combined with the light coming from the dichroic mirror 11 so as to be synthesized. Thereafter, the thus synthesized light is led to the projection lens system 15.

Convex lenses are respectively disposed behind the liquid crystal panels 6 to 8 in order that the beams of parallel light are converged by $\theta$. With this arrangement, it is feasible to diminish both an aperture of the projection lens system and the aberration.

If $\theta$ be more than 5°, however, color shading will be apt to appear on the picture, this leading to a decline in quality of the picture.

Figure 3:
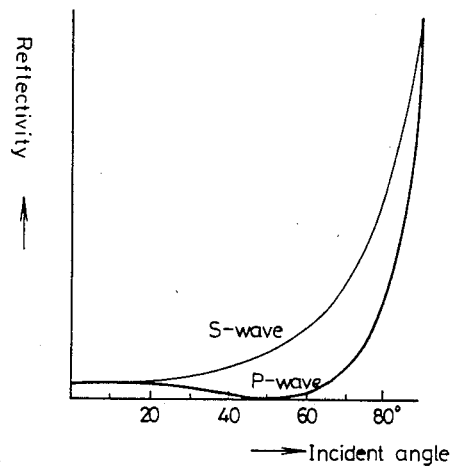
FIG. 3 is a characteristic diagram showing reflectivity on the surface of glass.

In this embodiment, the reason why the P-wave polarized light falls upon the dichroic mirrors 11, 12 is as follows. According to an experiment made by the present applicant, in the case of rectilinear polarization wherein TN (Twisted Nematic) type liquid crystal is utilized for the liquid crystal panels, it has been proved that ghost images are created by multiple reflections, depending on the axis of the light falling upon the dichroic mirror, and at the same time the images are of poor color purity. In the case of incidence of the P-wave polarized light, there is no problem. The incidence of S-wave polarized light, however, brings about the above-described problems. This is derived from the fact that a reflection factor of the P-wave on the surface of glass is, as shown in FIG. 3, different from that of the S-wave, and the spectral property of the dichroic mirror, as illustrated in FIG. 4, differs with respect to the S-wave and the P-wave.

Figure 5:
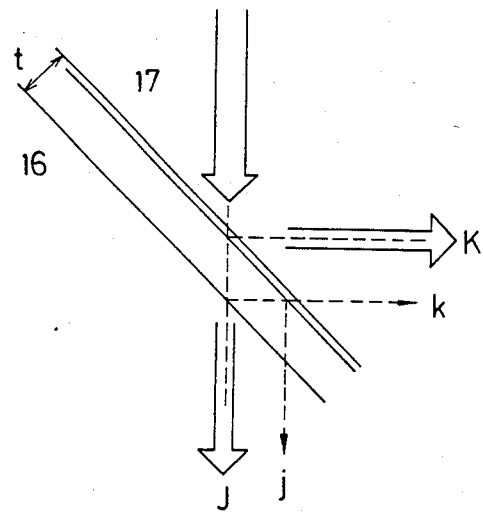
FIG. 5 is an explanatory view showing the light reflected on the dichroic mirror.

It can be understood that there is almost no reflection of the P-wave in the vicinity of an incident angle of 45°, whereas the reflection of the S-wave can be seen. This implies that a beam of light k reflected on the surface of a boundary between the glass and the air after transmitting a multi-layer thin film 17 among beams of light which have unnecessary wavelengths is large when the light of the S-wave falls upon the dichroic mirror 16 in FIG. 5. The same can be said of a beam of transmitted light j. Beams of the reflected light K, k and the transmitted light J; strike upon the projection lens system in such a way that they deviate laterally by only $\sqrt{2}t$ when t is defined as the thickness of the glass. Since 10–100-fold magnification is possible in the projection lens, if a mirror having an ordinary thickness of approximately 3 mm is employed, the aforementioned deviation becomes conspicuous and the ghost images are thereby projected.

Figure 4:
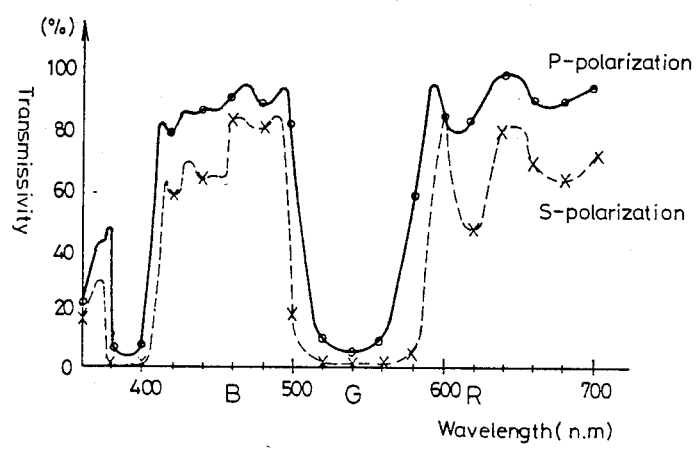
FIG. 4 is a characteristic diagram showing the spectral property of a G-reflection dichroic mirror which makes an incident angle of 45°.

Referring to FIG. 4, there is shown the spectral property of a G-reflection dichroic mirror which makes an incident angle of 45°. As is obvious from FIG. 4, a range of wavelength of the reflected light is comparatively narrow in regard to the P-wave, while on the other hand the S-wave has a relatively wide range. Videlicet, in the case of incidence of the light of S-wave, the light that is to be reflected ranges from G, R closely to B, and the color purity is thereby deteriorated.

To cope with this problem, the P-wave polarized light is arranged to fall upon the dichroic mirrors 11, 12 in this embodiment. Consequently, almost no reflection of the light with unnecessary wavelength is made. Furthermore, beams of the reflected light j and k shown in FIG. 5 susbstantially disappear. As a result, no ghost image is present on the screen, and there is no reflection of the light having unnecessary wavelengths, thereby obtaining images having favorable color purity.

The light source 1 generates heat and hence air-cooling is required. According to the constitution in this embodiment, highly efficient cooling is possible by virtue of ventilation made by actuating a fan on the front side or on the rear side of the Figure.

In the above-described embodiment, when using the halogen lamp as a light source, the direction in which the lamp is placed is so adjusted as to correspond to the property of light distribution. To be specific, the placement is, as illustrated in FIG. 1, so made that the wiring of a filament is directed to the liquid crystal panel 6 of R. The reason for this is described below.

Figure 6:
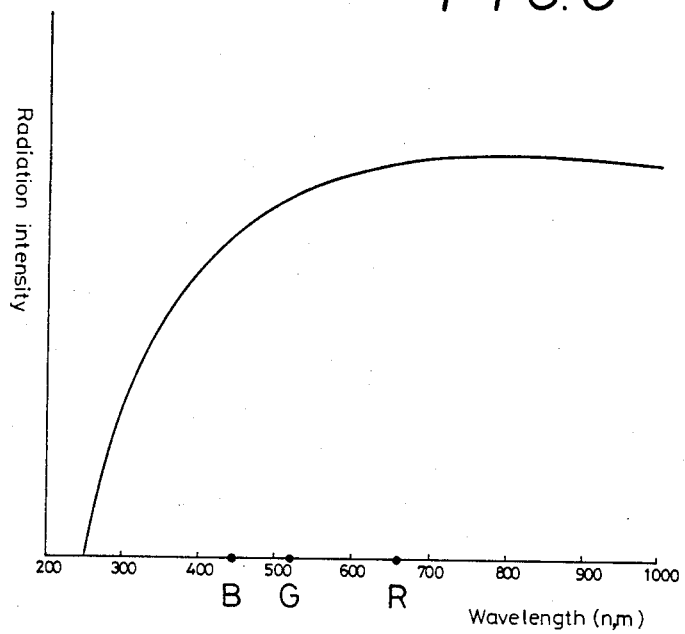
FIG. 6 is a characteristic diagram showing the radiation spectral distribution of a halogen lamp.

A radiation spectral distribution of the halogen lamp exhibits, as shown in FIG. 6, the highest intensity in R among R, G, B.

Figure 7:
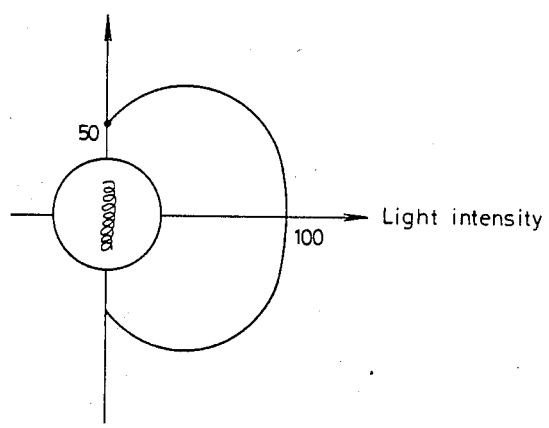
FIG. 7 is a characteristic diagram showing the property of light distribution of the halogen lamp.

On the other hand, it can be observed from FIG. 7 that the light intensity becomes feeble in the wiring direction of the filament of the halogen lamp.

In order to equilibrate the light intensities of R, G and B, the filament is so disposed as to direct its wiring to the liquid crystal panel with the result that the light intensity on the side of R is lower than those on the sides of G and B.

Figure 8:
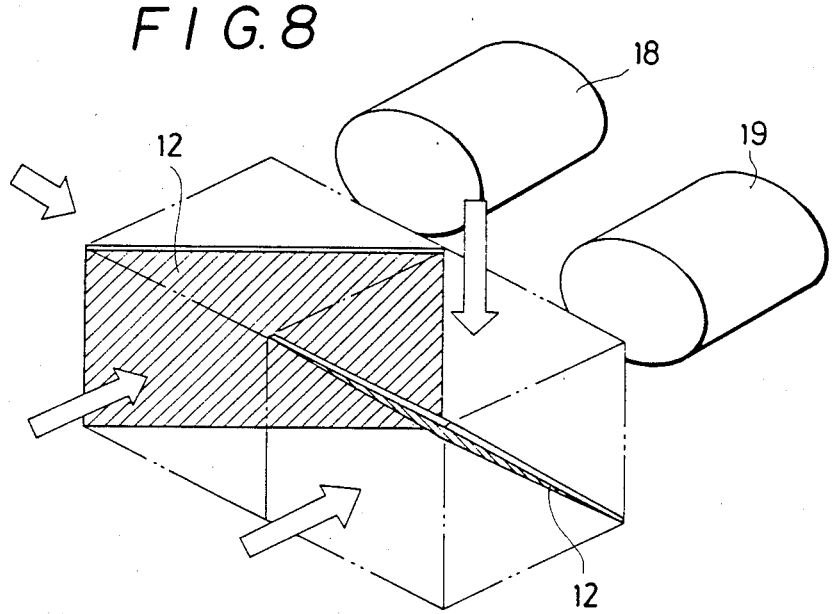
FIG. 8 is an explanatory view showing the projection lenses and the dichroic mirrors in front of these lenses when constructing a displaying device designed for stereoimages.

On the occasion of constituting the displaying device suitable for stereoimages by making use of two units of the devices shown in FIG. 1, the arrangement may be such that the G-reflection dichroic mirrors 12 are, illustrated in FIG. 8, in front of the projection lenses 18, 19. The light striking on the each individual dichroic mirror is, however, limited to the P-wave alone.

The polarization plates are not necessarily placed in front and in rear of the liqud crystal panel but may be disposed on this side of the projection lens or in front of the screen. Even such placement yields the same effects.

In the above-described embodiment, the positive TN type liquid crystal panel is employed. However, a negative TN type liquid crystal panel processing two pieces of polarization plates whose polarization axes are parallel with each other may also be used.

EFFECTS OF THE INVENTION

The present invention yields the following effects. Inasmuch as a single light source suffices, and even if this is deteriorated, no unevenness in color is produced. There are advantages in terms of cost and of constitution. The adjustment of the light source can be facilitated.

Since the light emitted from the light source is split into beams of light of two groups which are orthogonal to each other, the light source can easily be cooled off, and an efficiency in utilization of the light can be improved.

What we claim:

1. A projection type liquid crystal displaying device comprising: an optical system for splitting the light emitted from a light source into beams of substantially parallel light of two groups which are orthogonal to each other; a first reflection optical system for reflecting beams of the light of one group at a right angle so that they travel in the same direction as that of the other group; a first liquid crystal panel provided on a light path extending from said first reflection optical system; a first dichroic mirror orthogonally reflecting the light having specified wavelengths among beams of the light of the other group which come from said optical system and admitting the light having other wavelengths; a second liquid crystal panel provided on a light path for the light reflected on said first dichroic mirror; a second dichroic mirror admitting the light which passes through said first liquid crystal panel and reflecting the light which transmits said second liquid crystal panel so as to synthesize beams of such light; a third liquid crystal panel provided on a light path for the light transmitting said first dichroic mirror; a second reflection optical system for reflecting the light transmitting said third liquid crystal panel at a right angle; a third dichroic mirror for synthesizing the reflected light from said second reflection optical system with the transmitted light from said second dichroic mirror; and a projection lens system for projecting beams of the light which are synthesized by said third dichroic mirror.

* * * * *